United States Patent [19]

Suzuki

[11] 4,454,036
[45] Jun. 12, 1984

[54] OIL FILTER

[75] Inventor: Shinichi Suzuki, Itabashi, Japan

[73] Assignee: Shinwa Ltd., Tokyo, Japan

[21] Appl. No.: 417,112

[22] PCT Filed: Jun. 23, 1982

[86] PCT No.: PCT/JP82/00243
§ 371 Date: Sep. 7, 1982
§ 102(e) Date: Sep. 7, 1982

[87] PCT Pub. No.: WO83/00024
PCT Pub. Date: Jan. 6, 1983

[30] Foreign Application Priority Data

Jun. 23, 1981 [JP] Japan .................................. 56-95940
May 10, 1982 [JP] Japan .................................. 57-77744
May 10, 1982 [JP] Japan .................................. 57-77745

[51] Int. Cl.³ ............................................ B01D 27/04
[52] U.S. Cl. .................................... 210/117; 210/440; 210/494.1
[58] Field of Search ............... 210/DIG. 17, 489–491, 210/494.1, 494.3, 497.01, 117, 440

[56] References Cited

U.S. PATENT DOCUMENTS

| | | | |
|---|---|---|---|
| 2,110,009 | 3/1938 | Weidenbacker | 210/489 |
| 2,537,898 | 1/1951 | Hunter et al. | 210/489 |
| 2,738,879 | 3/1956 | Franz | 210/494.1 |
| 3,504,803 | 4/1970 | Brayman | 210/494.1 |
| 4,028,243 | 6/1977 | Offer et al. | 210/DIG. 17 |
| 4,324,660 | 4/1982 | Peyton et al. | 210/DIG. 17 |

FOREIGN PATENT DOCUMENTS

| | | |
|---|---|---|
| 47-1744 | 1/1972 | Japan . |
| 49-104268 | 9/1974 | Japan . |
| 52-67688 | 5/1977 | Japan . |

Primary Examiner—John Adee
Attorney, Agent, or Firm—Charles E. Pfund

[57] ABSTRACT

An oil filter is provided comprising a bottomed cylindrical casing (8, 106, 208), a base member including an oil inlet port (91c) and an oil exit port (91b) and adapted to close an open end of the casing and an isolating means (6, 107, 115, 206) formed about the filter element for isolating first and second oil paths to communicate one end and the periphery of a filter element formed by wrapping many times a sheet of thin filter paper about a core member with the first oil path (A) communicated with an oil inlet port and to communicate the other end of the filter element to the second element (B).

With this construction, since the first oil path communicated with the oil inlet side is positioned close to the end surface and the periphery of the filter element, the area upon which the oil collides and severe clogging is liable to occur can be increased thus maintaining the filtering capability over a long period.

19 Claims, 9 Drawing Figures

OIL FILTER

FIELD OF THE ART

This invention relates to an oil filter provided with a filter element formed by wrapping many times a thin sheet of filter paper about a core member.

BACKGROUND ART

Generally, in a motor car engine, an oil filter is included in a lubricating system for removing such impurities as worn out metal particles, carbon, etc. However, there is a limit for the filtering ability of the oil filter so that it has been necessary to exchange it at each run of 2,500–3,000 km for ordinary oil and to exchange the filter element at each run of 5,000–6,000 km. More particularly, a conventional filter element has adopted a system in which oil is passed substantially in the direction of the thickness of a single sheet of filter paper so that it is liable to result in clogging. Further, it has been quite impossible to arrest fine particles of carbon, ash component, worn out metal powders or the like of less than 10 microns, particularly water component.

As above described, to discard still substantially usuable lubricating oil merely due to the filtering capability of the oil filter not only contradicts resource saving but also these is a fear of causing a secondary public hazard and a solution of this has been desired. Consequently, it has been considered to use a filter element having a high filtering capability, but when such element is used, the cost generally increases. Furthermore, there is a defect that the size of the oil filter itself becomes large.

Accordingly, in recent years, it has been proposed a filter utilizing a so-called tissue element, that is a filter element prepared by wrapping many times a thin sheet of filter paper about a core body. With this oil filter, although a capability of filtering said fine particles and water component entrained into the oil can be fully expected there are such defects that the filtering efficiency is not high and that the construction is complicated, thus increasing the manufacturing cost. Namely, since the construction is such that the oil passes in the axial direction of the element (a direction parallel to the surface of the wrapped paper) there is a limit for the filtered flow quantity, that since the end surface acting as the inlet side of the oil is narrow when the arrested particles deposit on the surface, filtered flow quantity decreases greatly, and that since the element is tightly fitted in a casing it is necessary to use a special value.

DISCLOSURE OF THE INVENTION

Accordingly, the principal object of this invention is to provide an oil filter capable of maintaining the filtering capability over a longer period than the prior art.

Another object of this invention is to provide an oil filter capable of improving the filtering efficiency over the prior art.

Still another object of this invention is to provide an oil filter capable of not only accomplishing the objects described above but also can be manufactured at a relatively low cost and having a simple construction in the same manner as the prior art.

To accomplish these objects, according to this invention a first oil passage is formed at one end side and the periphery of a paper roll shaped filter element made of a thin sheet of paper, and second oil passage is formed on the other end side.

Accordingly, according to one embodiment of this invention, in an oil filter including a filter element formed by wrapping many times a sheet of thin filter paper about a core member, there is provided an oil filter, characterized by comprising a bottomed cylindrical casing, a base member closing the opening of the casing and having an oil inlet opening and an oil outlet opening and means for separating first and second oil passages, the means connecting one end and the periphery of the filter element to the first oil passage connected to the oil inlet opening and to the second oil passage containing the other end of the filter element.

BEST FORM FOR CARRYING OUT THE INVENTION

In the following, the invention will be described in detail with reference to the accompanying drawings.

Figure 1:
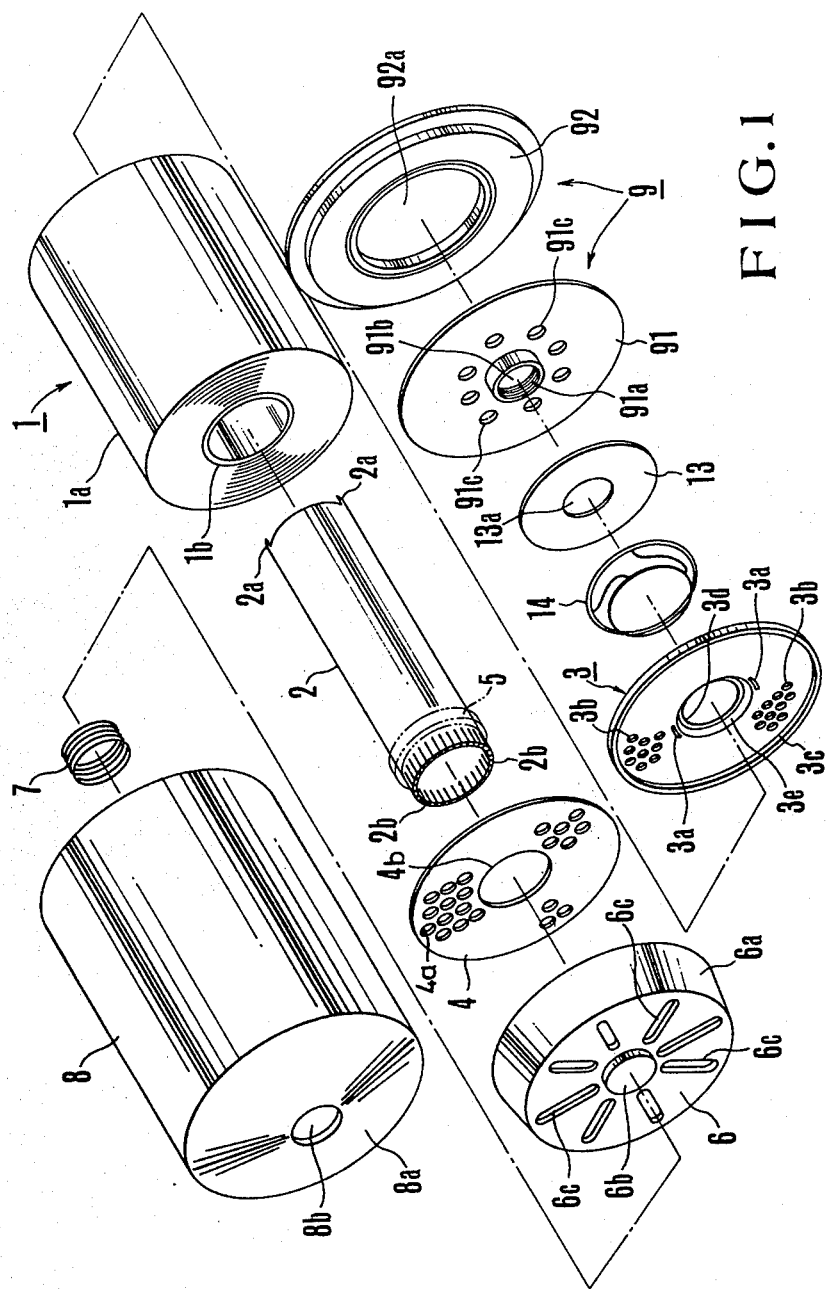
FIG. 1 is an exploded perspective view showing one embodiment of the oil filter according to this invention.
Figure 2:
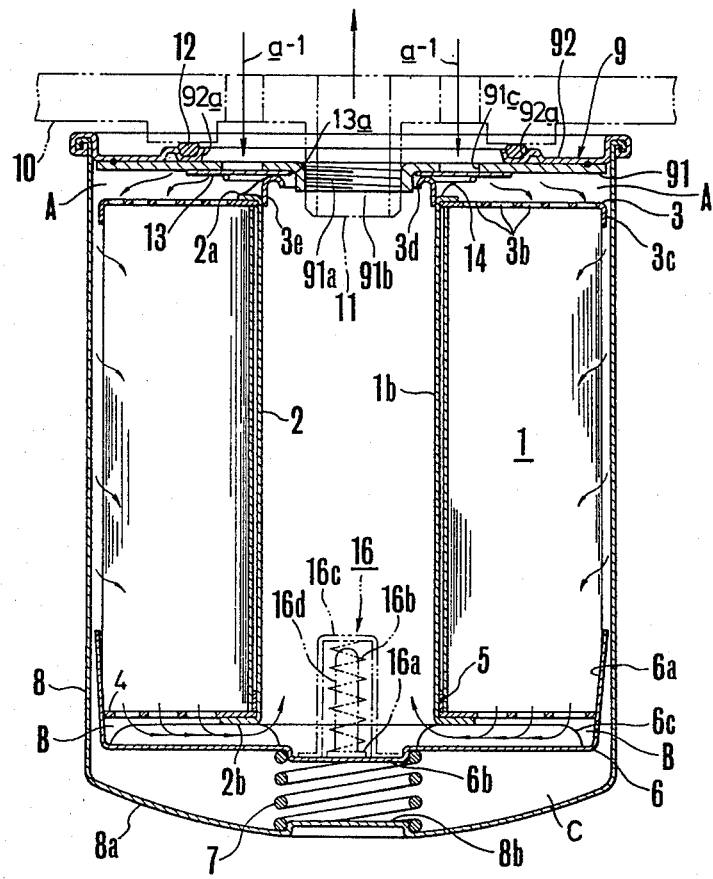
FIG. 2 is a longitudinal sectional view of the same.

Firstly, FIGS. 1 and 2 show one embodiment of an oil filter according to this invention, more particularly one example wherein the invention is applied to the oil filter for use in a motor car. In these drawings, a member designated by a reference charactor 1 is a filter element which is formed by wrapping many times a thin sheet of water insoluble paper 1a about a cylindrical core member 1b in the same manner as so-called toilet paper. Accordingly, the cylindrical core member 1b is made of a thick sheet of paper but the core member 1b is not always necessary to be made of a thick sheet of paper for the reason to be described later and it comprise a plastic pipe or a metal pipe. 2 to 4 designate holding members that hold said filter element 1 and constituted by a pipe 2 inserted into the element 1 and perforated plates 3 and 4 respectively secured to both ends of the pipe 2. Thus, one end of the pipe 2 is formed with two fixing projections 2a, 2a, and the other end is formed with fixing pieces 2b formed by a plurality of slits. Consequently, these members can be assembled by inserting said projections 2a, 2a into engaging openings 3a provided through the perforated plate 3 and then bending outwardly and by inserting the other end into the central opening 4a of the perforated plate 4. The perforated plate 3 is provided with numerous openings 3b, and an annular projected edge 3c for receiving one end of the filter element 1 is formed on the periphery thereof, while a cylindrical portion 3e having a bent back portion 3d is formed at the central portion. The perforated plate 4 has a diameter smaller than that of said filter element 1 and is formed with numerous openings 4b in the same, manner as said perforated plate 3. Reference character 5 represents an adhesive agent layer adapted to bond together said pipe 2, the perforated plate 4 and the element 1 and seal them together.

6 shows a cap fitted on the end of the filter element 1 hold by said holding members 2 to 4 and this cap 6 is integrally formed with a tapered cylindrical portion 6a which clamps the end periphery of the element 1 when the cap is applied, a projection 6b that engages a spring to be described later, and radial supporting members 6c projecting inwardly so as to support the element 1. 7 designates a compression spring that resiliently supports the filter element 1 held by this cap 6, and 8 a bottomed cylindrical or cup shaped casing, and the bottom 8a thereof is provided with a projection 8b that engages with said spring 7. An end opening of the casing 8 is sealed by a cover 9 after loading various elements. The inner diameter of the casing is dimensioned such that said perforated plate 3 loosely fit in the cap 6 so as to form an oil path between the outer periphery of said filter element 1 and the inner peripheral element of the casing.

The cover 9 is constituted by a base plate 91 and a sealing member 92 spot welded to the base plate 91. At the center of the base plate 91 are provided an oil exit port 91b having a threaded portion 91a threaded into the oil port 11 of an engine case 10, and oil inlet ports 91c formed around the oil exit port 91b. The sealing member 92 is provided with an opening 92a that opens said oil inlet ports 91c and the outer peripheral edge of the opening 92a is formed with a groove 92a 1 (see FIG. 2) into which an annular sealing member 12 fits. The periphery of the sealing member 92 is bonded to the end opening of said casing 8 by a bent back joint. 13 designates a member having an outer diameter dimension enough to cover said oil inlet port 91c and made of such resilient piece as rubber and the peripheral portion of a central opening 13a is clamped by the bent back portion 3d of said perforated plate 3, while portions near the outer edge are depressed by weak compression springs 14. Accordingly, the member 13 constitutes a one way valve in coorporation with the springs 14 which acts as a sealing member that prevents communication between the inlet side and the outlet side due to the clamping pressure of the bent back portion 3.

A relief valve 16 is shown by dot and dash lines at the lower center of FIG. 2 and constituted by a valve member 16a selectively opening and closing an opening (not shown) formed through the cap 6, a valve spring 16b and valve box 16c having a flange. The valve box 16c is provided with a deep slot 16d. As will be described later, the relief valve 16 is not always necessary is a type wherein a relief valve on the engine side is used.

Accordingly, as shown in FIG. 2 in the oil filter of this invention, a first oil path A is formed on the upper end and periphery of the filter element 1, and an oil path B communicated with the pipe 2 is formed between the lower end surface of the element 1 and the bottom of the cap 6, these both oil paths A and B being communicated with the oil inlet opening 91c and the oil outlet opening 91b respectively.

The operation of the oil filter will now be described. The oil supplied under pressure by an oil pump on the side of the engine in the direction of arrows 2 opens the member 13 against the resilient force of the spring 14 and enters into the first oil path A through the oil inlet ports 91c, that is into a space formed by the casing 8, inner side of the cover 9, and the upper end and the periphery of the element 1. At this time, the oil of course fills a spring chamber C formed between the cap 6 and the casing 8. The oil supplied to the first oil path A passes through the element 1 from the lower end and outer periphery thereof and filtered. Then, the oil flows into the oil path B from the lower end side of the element 1 and then sent out to the oil exit opening 11 of the engine casing 10 through the pipe 2. The flow speed of the oil through the element 1 is high in the axial direction of the element 1 but low in the diametrical direction. When the engine speed increases to increase the flow quantity of oil or when the element is clogged to decrease the filter flow quantity, the relief valve on the engine side opens to bypass the oil from the high pressure side to the low pressure side. This mechanism is the same as that of a generally used oil filter for an engine. Of course, where the relief valve 16 is provided for the cap 6, the oil not filtered would be bypassed through the relief valve 16.

As can be clearly noted from the foregoing description, the invention is characterized in that the oil entered into the filter element 1 from one end and periphery thereof is discharged from the other end surface of the element 1 so that as has been described above, when the cylindrical core member 1b is made of impervious material, the pipe 2 is not always necessary. Since the pipe 2 is used for the purpose of preventing the buckling deformation of the element 1, where the pipe is not used it is necessary to form the core member 1b with rigid material. For the purpose of increasing the flow quantity of the oil through the perforated plate 3 or 4 that holds the element 1 or preventing entraining of paper powder of the element, the perforated plate can be substituted by a metal wire net. Alternatively, a metal wire net may be provided on the outside or inner side of the perforated plate 4.

Although in the foregoing construction, the element 1 was supported by a projection 6c at the bottom of the cap 6, the second oil path B can be formed by holding the perforated plate 4 or an end of the element 1 by utilizing the taper of the peripheral wall 6a of the cap 6. The member 13 is not always necessry because it is merely used for the purpose of preventing flowing out of the inner oil when the oil filter is taken out. Although in the foregoing embodiment, the cover 9 was formed by bonding the base plate 91 to the sealing member 92 they can be formed as a single piece. Where a cooling fan is integrally provided on the outer wall surface of the casing, the cooling effect of the oil can be improved.

As above described, according to this invention, since the first oil path communicated with the oil inlet side is formed adjacent to the end surface and the peripheral surface of the element it is possible to make large the area impinged by the oil and where clogging is liable to occur. Accordingly, it is possible to maintain the filtering capability over a long period as well as a high filtering efficiency. Moreover as the second oil path remote from said first oil path can be formed by merely applying the cap on the other end of the element no special member is necessary, thus providing an oil filter using a paper roll type element having an extremely large filtering capacity with a simple construction. Since the cap has an inclined or outwardly spreading side wall, when the cap is applied, the element can readily be press-fitted into the cap. Moreover, even when the machining accuracy of the cap is not high, the element would be engaged by a suitable portion of the side wall, thus not only simplifying the apparatus but also decreasing the cost. Furthermore, since the first oil path is formed adjacent to the entire surface of the inner wall of the casing, the cooling effect of the oil can also be expected. In addition, with the construction shown in the embodiment, a substantial number of the component elements now being widely used can be used. Thus, there is such advantage that it is possible to provide an oil filter having a wrapped paper type element having many excellent filtering capabilities.

Figure 3:
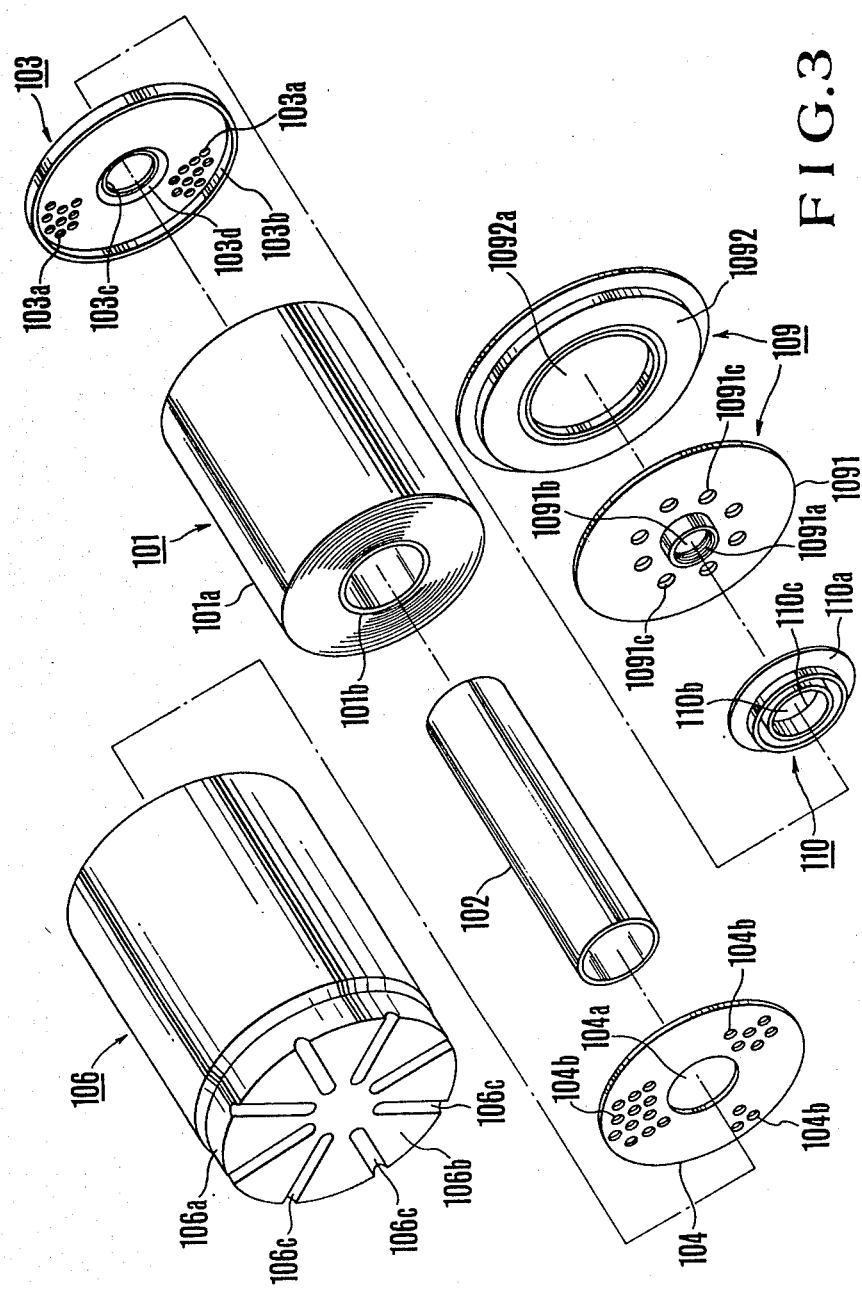
FIG. 3 is an exploded perspective view showing another embodiment of the oil filter embodying the invention.
Figure 4:
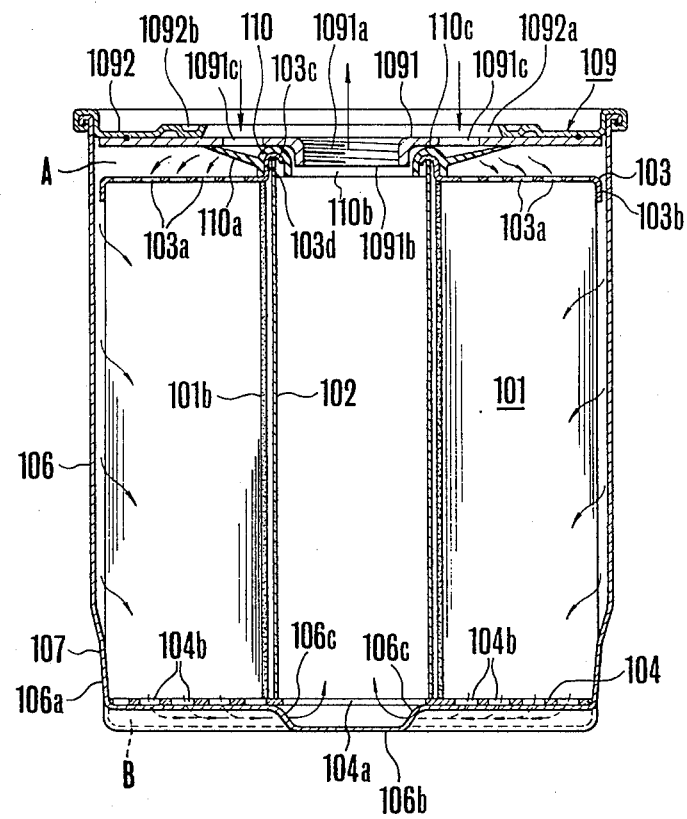
FIG. 4 is a longitudinal sectional view of the same.

FIGS. 3 and 4 show another embodiment of the oil filter according to this invention. In these figures reference numeral 101 shows a filter element similar to that shown in FIG. 1 and the element is formed by wrapping many times a water insoluble long sheet of thin paper 101a about a cylindrical core member 101b. Accordingly, although the cylindrical core member 101b is made of a thick sheet of paper the core member is not always necessary to be made of a thick sheet of paper but may comprise a plastic pipe a metal pipe. 102 to 104 designate a holding member for holding said holding element 101, which are constituted by a pipe 102 adapted to be inserted through the element 101, and perforated plates 103 and 104 positioned on both ends of the pipe for clamping the element. One of the perforated plate 103 is formed with numerous openings 103a. On the periphery of the plate 103 is formed with an annular projecting edge 103b, while at the central portion is integrally formed a cylindrical portion 103d having a bent back portion 103c at its end. The other perforated plate 104 has a smaller diameter dimension than the diameter of said filter element 101 and formed with numerous openings 104b like said perforated plate 103. At the central portion is provided an opening 104a communicated with the inside of the pipe 102.

106 designates a casing entirely covering the filter element 101 held by said holding members 102 to 104. The casing 106 is formed with a tapered cylindrical portion 106a that firmly clamps the end periphery of the element 101 when it is fitted and an integral supporting member 106c radially stamped out toward the inside of the casing bottom 106b so as to support the element 101 via said perforated plate 104. The inner diameter of the tapered cylindrical portion 106a is made to be slightly smaller than the outer diameter of the filter element 101. Accordingly, as the element 101 is fitted, the end portion undergoes compression deformation to form a press fitted portion 107. The inner diameter of the casing 106 except the tapered cylindrical portion 106a is dimensioned such that it loosely receive said perforated plate 103 so that an oil path will be formed between the outer peripheral surface of said filter element 101 and the inner peripheral surface of the casing.

A base 109 is constituted by an oil inlet member 1091 and a sealing member 1092 spot-welded to the oil sealing member 1091. At the central portion of the oil sealing member 1091 are formed an oil exit port 1091b having a threaded portion 1091a threaded into an oil port of an engine casing, and an oil inlet ports 1091c formed on the periphery of the exit port. On the other hand, the oil sealing member 1092 is provided with an opening 1092a for opening said oil inlet ports 1091c, and the peripheral portion is formed with a groove 1092b for receiving an annular sealing member interposed between it and the engine casing. The periphery of the sealing member 1092 is coupled to the opening end of said casing 106 by a folded back joint. 110 designates a check valve made of such resilient piece as rubber and having a skirt 110a having an outer diameter dimension enough to cover said oil inlet ports 1091c, and the periphery 110c of the central opening 110b is clamped by the bent back portion 103c of said perforated plate 103. Consequently, this check valve 110 acts as forms an one way valve due to the resiliency of the skirt 110a and functions as a sealing member that interrupts communication between the inlet port 1091c side and the exit port 1091b side by the clamping pressure applied to the peripheral portion 110c.

As a consequence, as shown in FIG. 4, the oil filter of this embodiment is formed with a first oil path A on the upper end side and the periphery of the filter element and a second oil path B between the lower end surface of the element 101 and the bottom 106b, the second oil path being communicated with the inside of the pipe 102. Both oil paths A and B are disconnected by the press fit portion 107 formed on the end periphery of the bottom side of the casing of the element 101 and are respectively communicatred with the oil inlet ports 1091c and the oil exit port 1091b.

Figure 5:
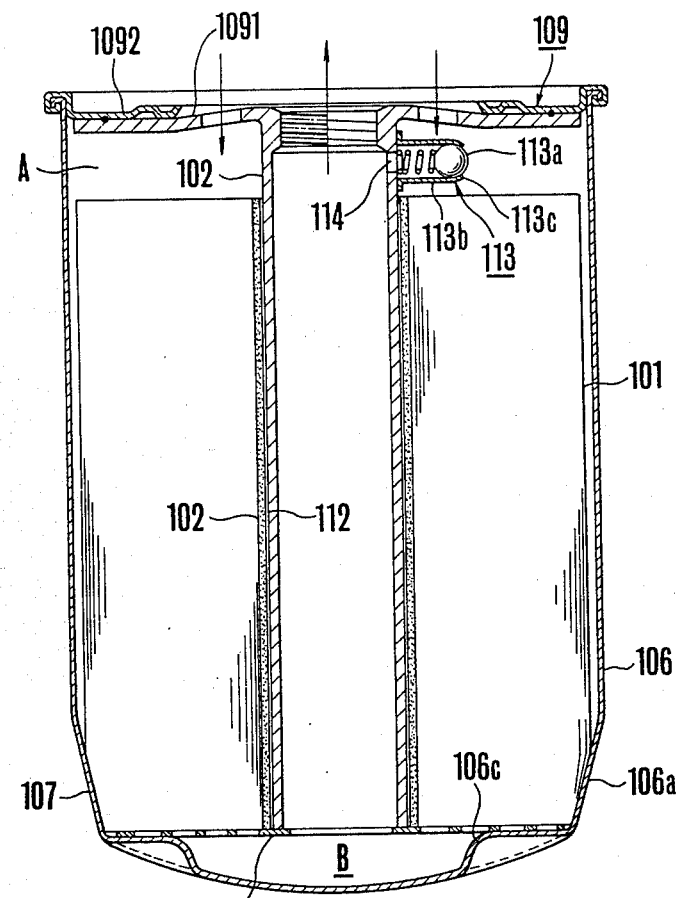
FIG. 5 is a longitudinal sectional view showing still another embodiment.

The operation of this oil filter will be described as follows. The oil sent under pressure by an oil pump on the engine side in the directions of arrows opens the skirt 110a of the check valve 110 against the resilient force of the skirt to enter into the first oil path A through the oil inlet port 1091c, that is into a space defined by the casing 106, the inner side of the base 109, and the upper end of the periphery of the element 101. The oil supplied to the first oil path A passes through the element 101 from the lower end and periphery of the element and then it is filtered. The oil is then enters into the second oil path B from the lower end surface side of the element 101 to be sent to the oil port of the engine casing through the pipe 102. When the engine speed increases and the oil flow quantity increases or when the element is clogged to decrease the filtered flow quantity the relief valve on the side of the engine opens to bypass the oil from the high pressure side to the low pressure side. This mechanism is the same as that of the engine oil filter generally and widely used. Where a relief valve is provided between the oil paths A and B as shown in FIG. 5, not filtered oil will be bypassed via the relief valve.

As can be clearly understood from the foregoing description, this embodiment is also characterized in that the oil entered into the element from one end surface and periphery thereof is discharged from the other end surface thereof, so that as above described, when the core member 101b of the element is made of rigid and impervious material, the pipe 102 is not always necessary. Furthermore for improving the flow quantity of the oil passing through the perforated plate 103 or 104 that holds the element 101 or for the purpose of preventing entraining the paper particles of the element, a metal wire net may be used instead of the perforated plate. Alternatively a metal wire net may be applied to either one of the inner surface and the outer surface of the perforated plate 104.

While the oil filter was constructed such that the element 101 is supported by a projection 106c projected from the bottom 106b of the casing 106, such projection 106c may be provided for the side of the perforated plate 104. Alternatively, the second oil path B may be formed by holding the perforated plate 104 or the end of the element by utilizing the taper of the tapered cylindrical portion 106a of the casing 106. Since the purpose of the check valve 110 is to merely prevent the contained oil from flowing out, it is not always necessary.

Furthermore in said embodiment, an example was illustrated in which the cover 109 is formed by bonding together the base 1091 and the sealing member 1092 they can be formed with an integral material.

FIG. 5 shows a modification of FIGS. 3 and 4. In this modification the oil port member 1091 of the base 109 and the pipe 102 for holding the element 101 are formed integrally and the core member 101b of the element 101 is bonded to the pipe 102. A reference numeral 112 shows a layer of a bonding agent, and 113 designates a relief valve interposed between the oil paths A and B and constituted by a valve member 113a, a valve spring 113b and a valve cylinder 113c, the relief valve being provided for a bypass passage 114 formed through the pipe 102 at one end thereof near the base.

Figure 6:
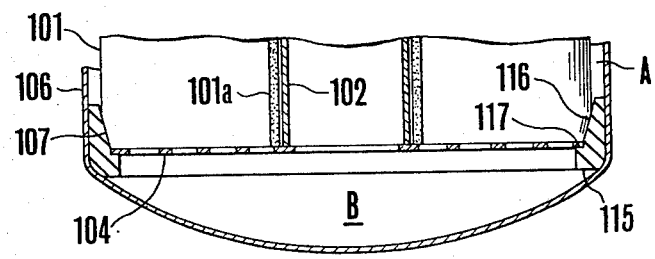
FIG. 6 is a longitudinal sectional view of essential portions showing yet another embodiment.

FIG. 6 shows another embodiment of the press fit portion 107. In this embodiment the press fit portion 107 dividing the oil paths A and B is formed by an annular sealing member 115 fitted in the bottom side of the casing 106. More particularly, the annular sealing member 115 is provided with a tapered opening 116 tightly clamping the end periphery of the filter element 1101 and a shoulder 117 receiving the perforated plate. Where the sealing member 115 is made of such resilient material as rubber or the like, it not only seals between the oil paths A and B but also acts as a member resiliently supporting the element. According to this embodiment, it is not necessary to provide the projection 106c or tapered cylindrical portion 106a for the casing as shown in said embodiment, and it can be applied to either one of the filters shown in FIGS. 4 and 5.

According to the embodiment just described, in the same manner as in the embodiments previously described, since the first oil path communicated with the oil inlet port side is closely located to the end surface and the peripheral surface of the element, the area upon which the oil impinges upon and the clogging occurs most frequently can be made large with the result that the filtering capability can be maintained over a long period and a high filtering efficiency can also be maintained. Moreover, since the second oil path isolated from said first oil path can be formed by merely press fitting the end of the element directly into the casing or through the annular sealing member it is possible to obtain an oil filter utilizing a wrapped paper type element having a simple construction and an extremely large filtering capacity without utilizing any special member. Moreover, as the first oil path is formed close to the peripheral end wall of the casing, the cooling effect of the oil can also be expected.

Figure 7:
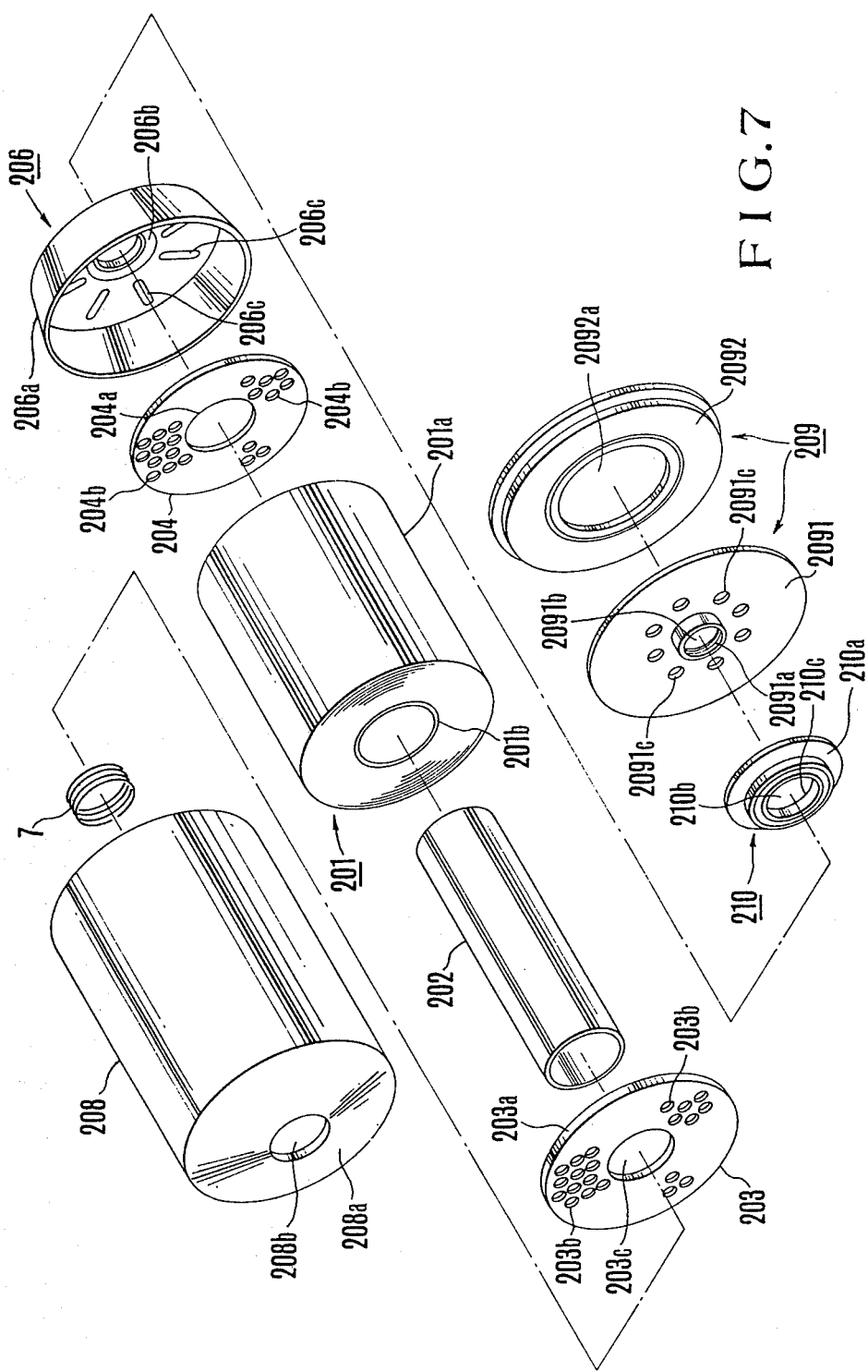
FIG. 7 is an exploded perspective view showing another embodiment of the oil filter according to this invention.
Figure 8:
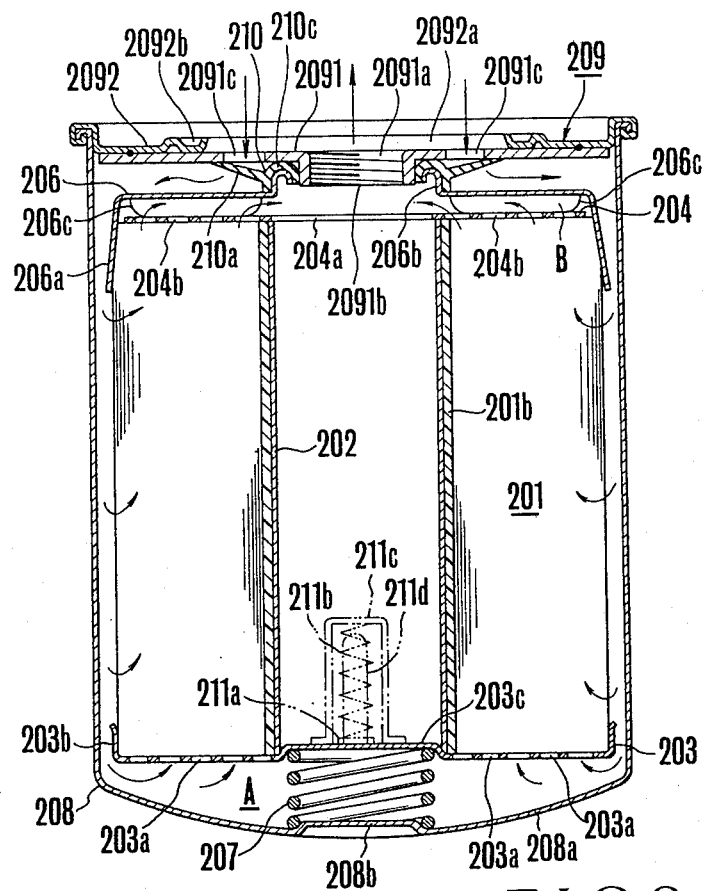
FIG. 8 is a longitudinal sectional view of the same.

FIGS. 7 and 8 show still another embodiment of this invention. In these figures, a reference numeral 201 designates a filter element formed by wrapping many times a water insoluble long sheet of thin paper 201a about a cylindrical core member 201b. Accordingly, the cylindrical core member 201b is formed with a thick sheet of paper, but for the reason to be described later, the core member 201b is not required to be always made of a thick sheet of paper but instead may comprise a plastic pipe or a metal pipe. 202 to 204 designate holding members that hold said filter element 201 and constituted by a pipe 202 inserted into the element 201, and perforated plates 203 and 204 positioned on both ends of the pipe for clamping the filter element 201. One of the perforated plate 203 is formed with numerous openings 203a, and the periphery thereof is formed with an annular projection 203b adapted to fit with the end portion of the filter element, while the central portion is integrally formed with a recess 203c acting as a seat for a coil spring to be described later. The other perforated plate 204 has a diameter smaller than that of said filter element 201 and is formed with numerous openings 204b like said perforated plate 203 and an opening 204a communicating with the interior of the pipe 202 is formed at the center.

206 designates a cap applied on one end of the filter element 201 being prevented from deformation by said holding members 202 to 204 and this cap 206 is provided with a tapered cylindrical portion 206a that firmly clamps the end periphery of the element 201 when the cap is applied to a cylindrical projection 206b that holds a check valve to be described later, and integral supporting members 206c radially stamped out toward the inside for supporting the element 201. Since the purpose of the supporting members 206c is to support said perforated plate 204 it is desirable to form them in the form of ridges having steep, as far as possible, edges so as not to close the openings 204b. 207 designates a compression spring for resiliently holding the filter element 201 held by the cap 206 and said holding members 202 to 204. 208 designates a bottomed cylindrical casing and its bottom 208a has an inwardly projecting projection 208b for receiving said spring 207. The end opening is sealed by a base 209 after loading various elements. The inner diameter of the casing 208 is dimensioned such that it loosely receive said perforated plate 203 and the cap 206 so as to for an oil path between the outer peripheral surface of said filter element 201 and the inner peripheral surface of the casing.

The base 209 is constituted by an oil port member 2091 and a sealing member 2092 spot welded to the oil port member 2091. At the central portion of the oil port member 2091 are provided an oil exit port 2091b having a threaded portion 2091a threaded into the oil port of an engine casing, not shown, and oil inlet ports 2091c formed about the exit port 2091b. On the other hand, the oil seal member 2092 is provided with an opening 2092a not covering said oil inlet ports 2091c, and about the periphery of the opening 2092a is formed a groove 2092b adapted to receive an O-ring interposed between the engine casing and the base. The periphery of the sealing member 2092 is banded to the end opening of said casing 208 by a folded back joint 210 designates a check valve made of such resilient material rubber and including skirt 210a having an outer diameterical dimension enough to cover said oil inlet port 2091c and the peripheral portion 210c of its central opening 210b is clamped by the projections 206b of said cap 206. Consequently this check valve 219 acts as an one-way valve by the resiliency of the skirt 210a and functions as a sealing member that presents communication between inlet port 2091c side and the outlet port 2091b side by the clamping pressure to the peripheral portion 210c.

A relief valve is shown at the lower center of FIG. 8 and constituted by a valve member 211a which selectively opens and closes an opening (not shown) formed through the perforated plate 203, a valve spring 211b, and a valve box 211c having a flange, the box 211c being formed with a deep slot 211d. The relief valve 211 is not necessary for the types in which a relief valve is provided on the side of a pump or a bypass type or shunt type filter system.

Consequently, according to the oil filter of this invention, as shown in FIG. 8, a first oil path A is formed on the lower end and its priphery of the filter element 201, and a second oil path B is formed between the upper surface of the element 201 and the bottom of the cap 206. These both oil paths A and B are communicated with the oil inlet port 2091c and the oil exit port 2091b respectrively.

The operation of this oil filter will now be described. The oil supplied from an oil pump from the engine side in the directions of arrows opens the skirt 210a against the resilient force of the skirt 210a of the check valve 210 and then enters into the first oil path A from the oil input port 2091c, that is into a space defined by the inner side of the casing 208, and the lower end and the periphery of the element 201. The oil supplied to the first oil passage A passes through the element 201 from the lower end and the outer periphery of the element 201 to be filtered. The oil then enters into the second oil path B from the upper surface side of the element and is sent to the oil port of the engine casing via the oil exit port 2091b. As the engine speed increases and the oil flow quantity increases or the filtered flow quantity decreases due to clogging of the element, the relief valve on the engine side opens to bypass the oil from the high pressure side to the low pressure side. The mechanism above described is the same as that of the engine oil filter now being widely used. Of course not filtered oil is bypassed to the cap 206 via the relief valve 211.

As will be clear from the foregoing description, since the invention is characterized in that the oil entered into the filter element 201 from one end surface and periphery thereof is discharged from the other end surface of the element 201, when the core member 201b of the element is made of rigid and impervious material as above described, it is not always necessary to use the bypass 202. For the purpose of increasing the flow quantity of the oil passing through the perforated plate 203 or 204 that holds the element 201 or to prevent admixing of paper powders of the element a metal wire net may be substituted for the perforated plate. Alternatively, a metal wire net may be positioned on either one of the inside and outside of the perforated plate 204.

Instead of supporting the element with projections 206c projected from the bottom of the cap 206, the second oil path B can be formed by holding the end of the perforated plate 204 or element 201 by using the taper of the peripheral wall 206a of the cap 206 or by providing a projection on the side of the perforated plate 204. Furthermore, since the check valve 210 is provided merely for the purpose of preventing flowing out of the contained oil when the oil filter is removed, it is not always necessary. Further, in said embodiment, an example was shown in which the base 209 is formed by bonding together the oil port member 2091 and the sealing member 2092, but these members may be formed with a single material.

Figure 9:
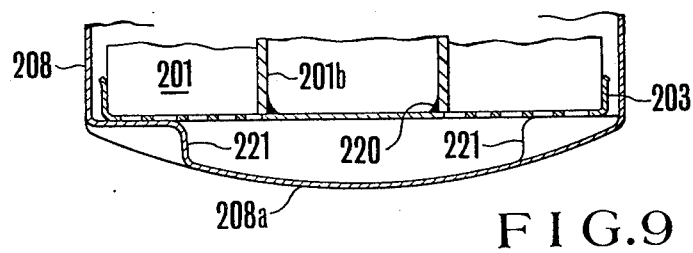
FIG. 9 is a sectional view of the essential portions of another embodiment.

FIG. 9 shows an embodiment which does not use the pipe 202 and the coil spring 207. As above described, since the pipe 202 is used for the purpose of preventing the deformation of the filter element 201 it is not necessary when the core member 201b is made of plastic fiber, for example. Furthermore, the coil spring 207 is used to clamp and hold the filter element 201 when the filter element 201 is held by utilizing the resiliency of the check valve 210, the coil spring 207 may be omitted. In the drawing, 220 designates a layer of a bonding agent for forming a seal, and 221 designates radial projections pressed out from the bottom 208a of the casing 208. In an embodiment not provided with a relief valve as it not necessary to form an oil passage in the core member 201b, the core member 201b is not necessary to be a hollow body, and a solid rod may be used.

In each embodiment described above a construction was shown in which an end surface of an element is supported by a perforated plate, where an end surface is solidified one or both of the perforated plate may be omitted. For example, the end surface can be partially solidified by radially applying a plastic type solvent.

As above described according to this embodiment, in the same the preceding embodiments since the first oil path communicated with the inlet side of the oil is located close to one end surface and the periphery of the element the area upon which the oil collides and causes serious clogging can be made large thus maintaining the filtering ability over a long period and a high filtering efficiency. Further, as it is possible to form the second oil path isolated from said first path by merely applying a cap onto the other end of the element an oil filter utilizing a wrapped paper type element having an extremely large filtering capacity can be obtained with simple construction not requiring any special member. Moreover an oil path communicated with an oil inlet side and passed through the oil is formed along the entire inner wall surface of the casing, cooling function of the oil can also be expected. In addition where the embodiment is constructed as shown in the accompanying drawing substantial number of component elements now being widely used can be utilized so that there is an advantage that it is possible to provide an oil filter having a wrapped roll type element having excellent filtering capability without increasing the number of the component parts.

Table of Reference Numerals and Symbols 1, 101, 201 ... filter elements; 1a, 101a 201a ... thin paper; 1b, 101b, 201b ... cylindrical core members; 2, 102, 202 ... pipes; 2a ... projection; 3, 4, 103, 104, 203, 204 ... perforated plates; 3a, 3b, 4a, 4b, 103a, 104a, 104b, 203a, 204a, 204b ... openings; 3d, 103c ... bent back portions; 3e 103b, 203b ... annular flanges; 3c, 103d ... cylindrical portions; 5, 112, 220 ... binder layers; 6, 206 ... caps; 6a ... tapered cylindrical portion; 6b ... projection; 6c ... supporting member; 7, 207 ... compression coil springs; 8, 106, 208 ... casings; 8a, 208a ... bottoms; 8b, 208b ... projections; 9, 209 ... covers; 91, 1091, 2091 ... base plates, oil inlet members; 91a, 1091a, 2091a ... threaded portions; 91b, 1091b, 2091b ... oil exit ports; 91c, 1091c, 2091c ... oil inlet ports; 92, 1092, 2092 ... sealing members; 92a, 1092a, 2092a ... penings; 10 ... engine casing; 11 ... oil port; 12 ... annular sealing member; 13 ... resilient member; 13a ... central opening; 14 ... compression spring; 16, 113, 211 ... relief valves; 16a, 113a, 211a ... valve members; 16b, 113b, 211b ... valve springs; 16c, 113c, 211c ... valve boxes; 16a ... deep slot; A ... first oil path; B ... second oil path; 106a, 206a ... tapered cylindrical member; 106b ... casing bottom; 106c ... supporting member; 107 ... pressed-in member; 109 ... base; 1092, 2092b ... groove; 110, 210 ... check valves; 110a, 210a ... skirts; 110b, 210b ... central openings; 110c, 210c ... peripheral portions; 114 ... bypass passage; 115 ... annular sealing member; 116 ... tapered opeing; 117 ... shoulder, 203c ... recess; 206b ... cylindrical projection; 206c ... supporting member; 221 ... stamped portion.

What is claimed is:

1. An oil filter of the type including a filter element formed by wrapping many times a sheet of thin filter paper about a core member, characterized in that there are provided a bottom cylindrical casing (8, 106, 208); a base member (9, 109, 209) closing an opened end of said casing and including an oil inlet port (91c, 1091c, 2091c) and an oil exit port (91b, 1091b, 2091b), and means for isolating first and second oil paths provided about the periphery of the filter element so as to communicate one end and the periphery of the filter element with the first oil path (A) in communication with the oil inlet port and to communicate the other end of the filter element with the second oil path (B).

2. The oil filter as set forth in claim 1 wherein perforated members (3, 4) are disposed respectively on both ends of said filter element.

3. The oil filter as set forth in claim 2 wherein one of the perforated plate (3) close the base member is provided with a cylindrical portion (3e) at its center, said filter element is separated from said base member by said cylindrical portion to ensure the first oil path and the first oil path and the second, oil path are separated by the cylindrical portion.

4. The oil filter as set forth in claim 3 wherein said perforated plates (3, 4) are respectively supported by a pipe 2 extending through said core member.

5. The oil filter as set forth in claim 3 wherein members constituting a check valve 13 are disposed about the cylindrical portion 3e of said perforated member 3.

6. The oil filter as set forth in claim 1 wherein said separating means comprises a bottomed cylindrical cap (6) applied to an end of the filter element.

7. The oil filter as set forth in claim 6 wherein said cap 6 comprises supporting members 6a radially projecting to the side of said second oil path for ensuring the second oil path between the supporting members 4 and said perforated member, and wherein a compression spring (7) is disposed between the cap 6 and the inner bottom of the casing 8.

8. An oil filter of the type including a filter element 1 formed by wrapping many times a sheet of thin filter paper about a cylindrical core member 16, characterized in that said filter element (1, 101, 201) is covered by a casing (8, 106, 108) and a cover (9, 109, 209) for forming a first oil path (A) defined by the one end surface and the periphery of the filter element, that a bottomed cylindrical cap 6 is applied to the other end of the filter element so as to form a second oil path B between the other end surface of the element and the bottom of the cap, said second oil path B being communicated with the interior of said cylindrical core member, and that an oil inlet 91c and an exit port 91b are opening in said first and second oil paths respectively.

9. The oil filter as set forth in claim 1 wherein said isolating means comprises a pressed-in member 106 a formed about the periphery of the end portion of the bottom side of the casing.

10. The oil filter as set forth in claim 9 wherein said pressed-in member 106 a comprises an inclined surface 107.

11. The oil filter as set forth in claim 1 or 9 wherein said isolating member comprises pressed-in members formed about the end portion on the bottom side of the casing and the bottom of said casing includes bearing members (106c) projected radially and inwardly.

12. The oil filter as set forth in claim 11 wherein said perforated member is held by a pipe (102) extending through the core member, and a ring shaped resilient member (110) is disposed between a perforated member (103) near the base portion and the base (109) for constituting a check valve.

13. An oil filter of the type comprising a filter element formed by wrapping many times a sheet of thin filter paper about a cylindrical core member, a bottomed cylindrical casing 8 covering the filter element, and a base 9 having an oil inlet and outlet ports for closing an opened end of said casing, characterized in that a pressed in member 106a is formed at the periphery of the end at the bottom side of the casing of said filter element to form first and second oil paths A and B partitioned by the pressed in portion, and that these first and second oil paths are communicated with the oil inlet port and the oil exit port respectively.

14. The oil filter as set forth in claim 1 wherein said base further comprises a pipe (102) disposed to extend through the core member of the filter element from the oil exit port, and said core member is bonded to said pipe.

15. The oil filter as set forth in claim 14 wherein the base is separated from the end of said filter element by a certain distance, and wherein a relief valve 16 interconnecting the first and second oil paths is provided for base side portion of said pipe.

16. The oil filter as set forth in claim 10 wherein said isolating means comprises an annular sealing member (110) with its outer periphery contacted wit the inner wall of the cover 109, and the inner wall contacted with the end portion of the filter element 17. The oil filter according to claim 1 which comprises a pair of perforated members (203, 204) disposed on both ends of said filter element and a pipe (202) extending through said core member for interconnecting these perforated members, one (204) of said perforated members has an opening (204a), while the central portion of the other perforated member (203) is closed for receiving one end of a compression spring (207) disposed between the perforated member (203) and the bottom of the casing (208), and a cap (206) constituting said isolating means is disposed between one (204) of said perforated members and the base.

18. The oil filter as set forth in claim 1 which comprises a pair of perforated members (203, 204) disposed on both ends of said filter element, and a pipe (202) extending through said core member for supporting these perforated members, one (204) of said perforated members has an opening (204a) at its center, and the central portion of the other perforated member (203) is closed, and wherein a pressed in portion acting as the isolating means is formed about the bottom side end of said casing and radially extending supporting members (221) in contact with one (203) of the perforated member are formed on the bottom of said casing.

19. An oil filter, characterized by comprising a filter element (201) formed by wrapping many times a sheet of thin filter paper about a core member, a bottomed cylindrical casing (208) covering the filter element,, a base (209) having oil inlet and exit ports for closing an opened end of said casing, and a cap (206) interposed between the base and said filter element, said cap being applied to one end of the filter element for forming an oil path between one end surface of the filter element and the bottom of the cap, said oil path being communicated with said oil exit port.

* * * * *

UNITED STATES PATENT AND TRADEMARK OFFICE
CERTIFICATE OF CORRECTION

PATENT NO. : 4,454,036

DATED : June 12, 1984

INVENTOR(S) : Shinichi Suzuki

It is certified that error appears in the above-identified patent and that said Letters Patent is hereby corrected as shown below:

```
Column 1, line 27: change "these" to --there--

Column 2, line 42: change "charactor" to --character--

Column 3, line 52: change "is" to --in-- (second occurrence)

Column 4, line 42: change "necessry" to --necessary--

Column 5, line 19: after "plastic pipe" insert --or--

Column 5, line 58: change "and an oil" to --and oil--

Column 6, line 4: change "acts as forms an one" to
                      --acts and forms a one--

Column 6, line 19: change "communicatred" to --communicated--

Column 6, line 31: change "enters" to --entered--

Column 8, line 47: change "diameterical" to --diametrical--
```

UNITED STATES PATENT AND TRADEMARK OFFICE
CERTIFICATE OF CORRECTION

PATENT NO. : 4,454,036

DATED : June 12, 1984

INVENTOR(S) : Shinichi Suzuki

It is certified that error appears in the above-identified patent and that said Letters Patent is hereby corrected as shown below:

```
Column 8, line 67: change "priphery" to --periphery--

Column 9, line 4: change "respectrively" to --respectively--

Column 9, line 68: after "as it" insert --is--

Claim 7, col. 11, line 32: omit "4"
                 line 33: change "member," to --member 4, --

Claim 16, col. 12, line 27: change "wit" to --with--

Column 10, line 48: change "...penings;" to --...openings;--

Column 10, line 61: change "opeing;" to --opening;--
```

Signed and Sealed this

Thirtieth Day of April 1985

[SEAL]

Attest:

DONALD J. QUIGG

Attesting Officer     Acting Commissioner of Patents and Trademarks